United States Patent

[11] 3,603,235

| [72] | Inventor | Norman E. Nelson<br>Roseville, Minn. |
|---|---|---|
| [21] | Appl. No. | 797,407 |
| [22] | Filed | Feb. 7, 1969 |
| [45] | Patented | Sept. 7, 1971 |
| [73] | Assignee | Minnesota Mining and Manufacturing Company<br>St. Paul, Minn. |

[54] SHUTTER-OPERATING AND FILM-ADVANCING MECHANISM
5 Claims, 7 Drawing Figs.

[52] U.S. Cl. ............................................. 95/31 AC
[51] Int. Cl. ............................................. G03b 17/42,
G03b 19/04
[50] Field of Search .................................. 95/31, 11

[56] References Cited
UNITED STATES PATENTS

| 3,232,196 | 2/1966 | Sapp et al. | 95/31 |
| 2,984,166 | 5/1961 | Van Den Braek | 95/31 |
| 3,416,424 | 12/1968 | Harvey | 95/31 |
| 3,039,441 | 6/1962 | Padelt et al. | 95/31 X |
| 2,940,682 | 6/1960 | Steineck | 95/31 X |
| 2,933,027 | 4/1960 | Hollingworth et al. | 95/31 |

Primary Examiner—Samuel S. Matthews
Assistant Examiner—Russell E. Adams, Jr.
Attorney—Kinney, Alexander, Sell, Steldt and Delahunt ABSTRACT: Shutter-operating and film-advancing mechanism designed to assure exposure of each frame of film in a camera but to prevent double-exposure of any one frame of film. The mechanism includes shutter-actuating and film-advance-actuating members movable to energized positions; drive means for advancing the film-advance-actuating member to an energized position; connection means connecting the shutter-actuating member to the film-advance-actuating member so that the former is moved to an energized position as the latter is moved to its energized position; and trigger means operable when the two members are in their energized positions for disconnecting them, whereupon (a) the shutter-actuating member quickly moves to its rest position and operates the shutter and (b) the film-advance-actuating member, upon release of the drive means, later moves to its rest position and advances film. Generally, the shutter-actuating member strikes and opens an impact shutter, and the film-advance-actuating member engages a lever movable to advance film one frame-length.

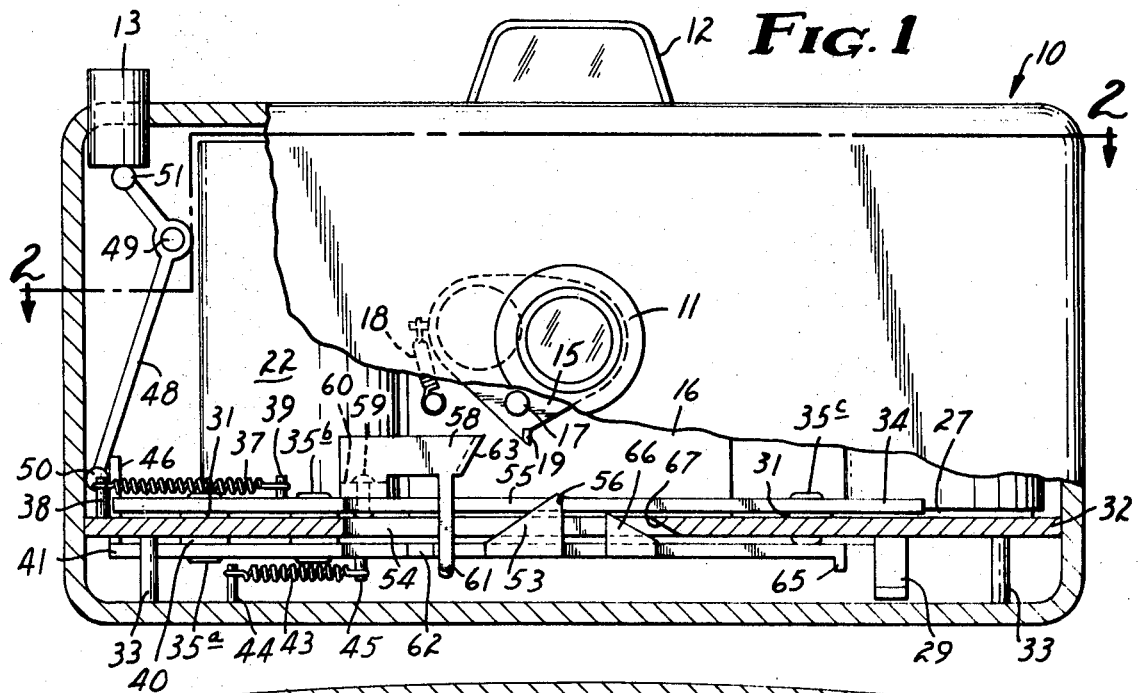
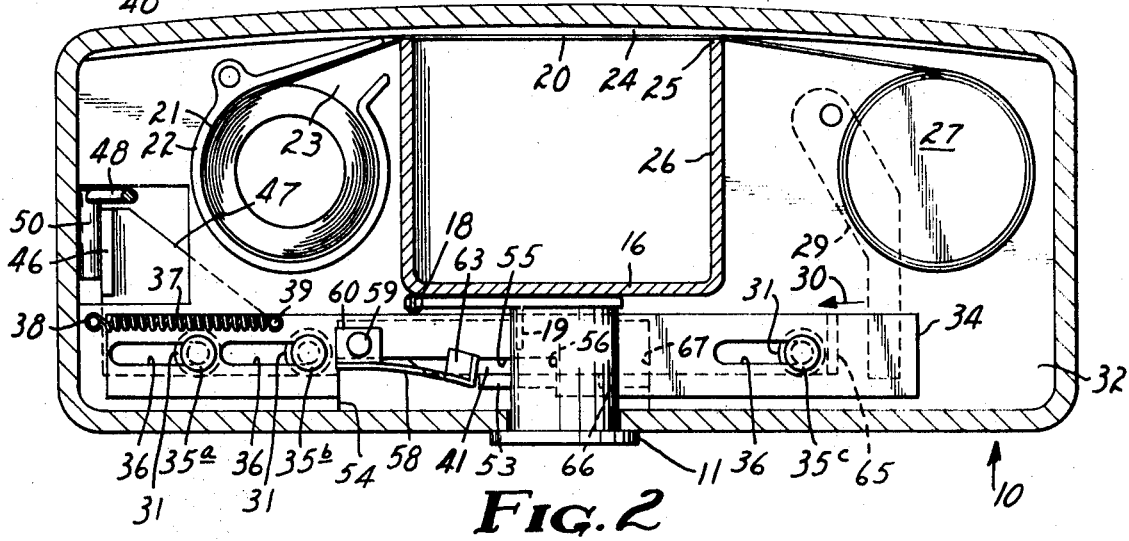
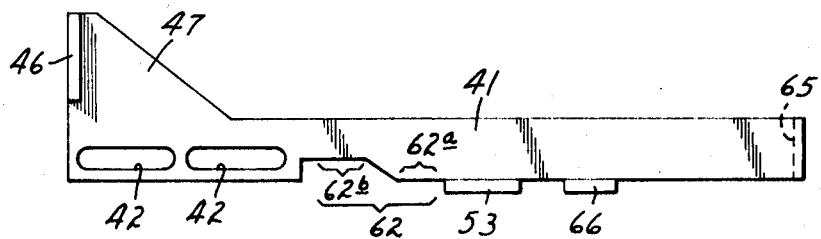

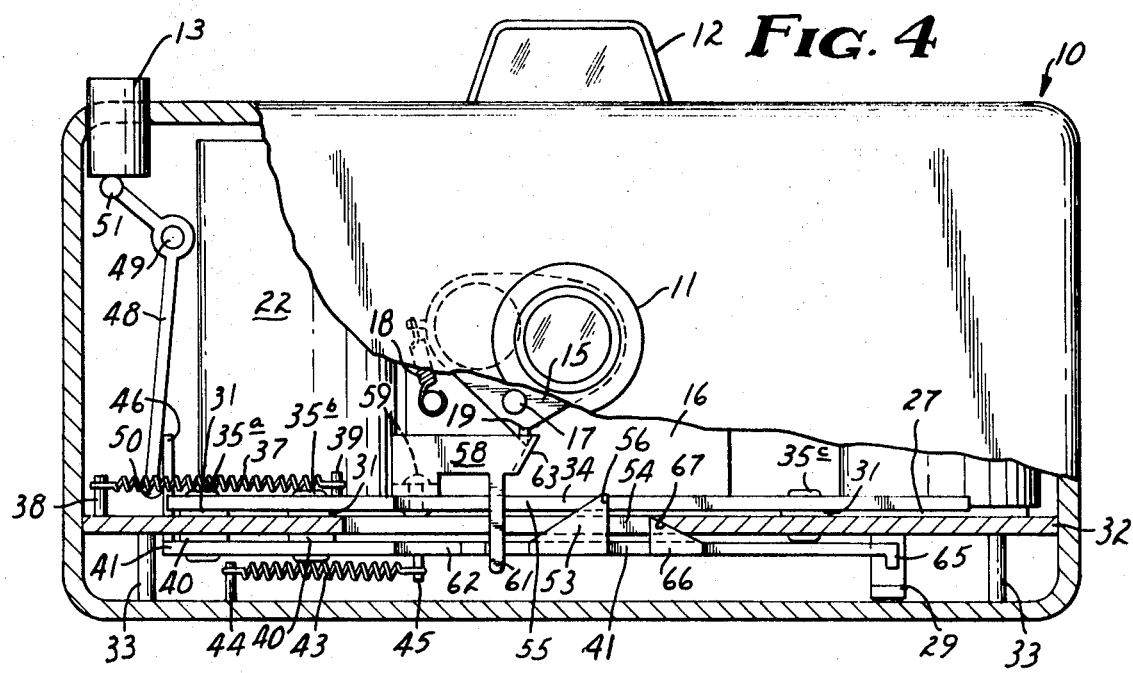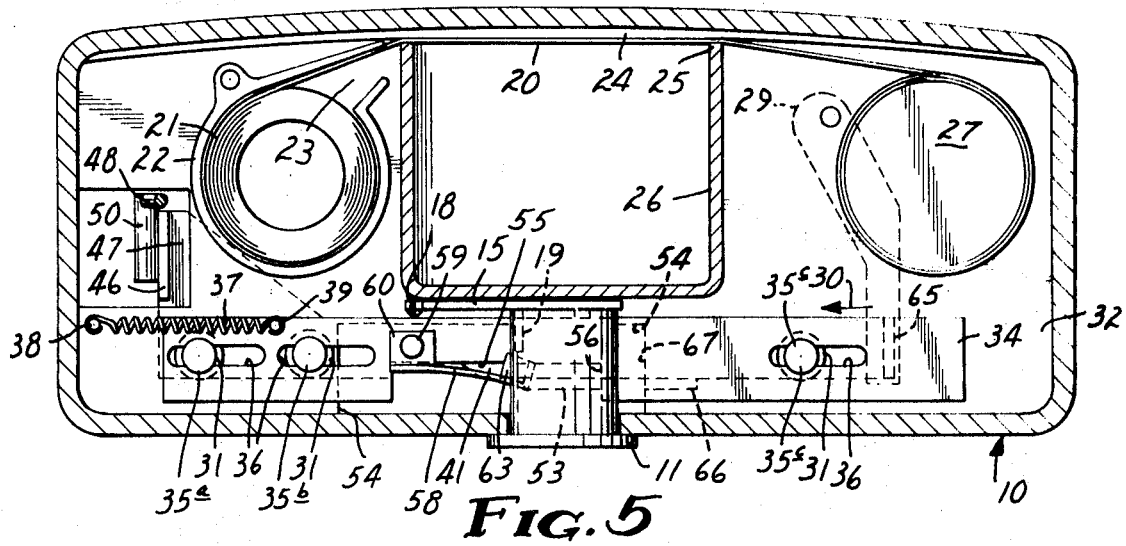

PATENTED SEP 7 1971 3,603,235

INVENTOR.
NORMAN E. NELSON
BY Kinney, Alexander,
Sell, Steldt & DeLaHunt
ATTORNEYS 3,603,235

SHUTTER-OPERATING AND FILM-ADVANCING MECHANISM

SUMMARY OF THE INVENTION

The present invention is particularly directed to preloaded, single-use cameras—which consumers purchase, operate to expose the preloaded film, and then return to a film processor. Such cameras must be inexpensive in structure to account for the possibility that at some time during their use they will not be returned or will be damaged. Yet, despite the need to be low in cost, they should incorporate as many features as possible that make use of the camera convenient and satisfactory results more certain. One such mechanism is an interconnected shutter-operating and film-advancing mechanism designed to assure that, without any action by the camera user, there will be an exposure, but not a double-exposure, of each frame of film in the camera. The present invention provides such a mechanism for a preloaded camera.

The invention is also directed to a particular kind of preloaded camera. In these cameras (which also may be made in nonpreloaded versions), a lever is movable to rotate a takeup spool in an increment of rotation sufficient to advance film in the camera one frame-length. Preferably the takeup spool is spring-biased in the direction of takeup rotation, and the lever is a stop-release lever that is movable to release stop means that normally hold the spool against takeup rotation. Cameras of the invention also generally include a shutter that is opened temporarily for a short picture-taking interval when a part of the shutter is struck, for example, an impact-type shutter.

In general, the shutter-operating and film-advancing mechanism provided by this invention includes 1. a shutter-actuating member mounted in the camera for movement against spring tension from a rest position to an energized position;
2. a film-advance-actuating member mounted in the camera for movement against spring tension from a rest position to an energized position;
3. a striker attached to the shutter-actuating member and adapted to strike the shutter and open it during the return movement of the shutter-actuating member from its energized position to its rest position;
4. engaging means on the film-advance-actuating member adapted to engage the lever and move it to rotate the takeup spool during return movement of the film-advance-actuating member from its energized position to its rest position;
5. drive means operable by the camera user to forward the film-advance-actuating member to its energized position and releasable to permit the member to return under the force of the spring tension from its energized position to its rest position;
6. connection means connecting the shutter-actuating member to the film-advance-actuating member so that forward movement of the film-advance-actuating member causes the shutter-actuating member to move forward; and
7. trigger means operable when the shutter-actuating and film-advance-actuating members are in their energized position for disconnecting the shutter-actuating member from the film-advance-actuating member, whereupon the shutter-actuating member returns under the force of the spring tension from its energized position to its rest position.

Until the triggering movement occurs, the camera user is free to release his pressure on the camera-actuating button without either causing an exposure of film or advancing the film. After the triggering movement, it is assured that both an exposure of film and advancement of film will occur.

DESCRIPTION OF THE DRAWINGS

FIG. 1 is a front elevation view, partially in section, of a camera of this invention;

FIG. 2 is a horizontal sectional view of a camera of this invention taken along the line 2—2 in FIG. 1;

FIG. 3 is a plan view of one part of the shutter-operating and film-advancing mechanism of this invention;

FIGS. 4, 6, and 7 are front elevation views, partially in section, showing the shutter-operating and film-advancing mechanism of the invention in advanced states of operation; and FIG. 5 is a horizontal section showing the shutter-operating and film-advancing mechanism of the invention in an advanced state of operation.

DETAILED DESCRIPTION

Figure 6:
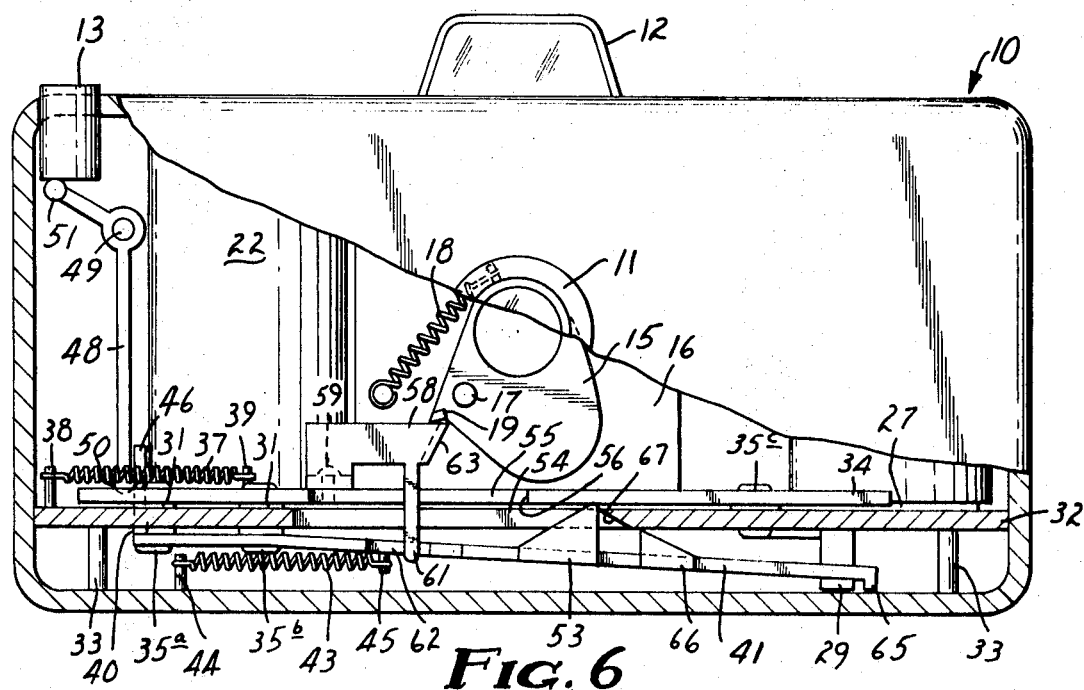

The camera 10 of this invention illustrated in FIG. 1 includes a lens 11, a viewfinder 12, and a camera-actuating button 13. Most of the front face of the camera is broken away in FIG. 1 to reveal the interior parts of the camera, including the shutter-actuating and film-advance-actuating mechanism of this invention. A shutter blade 15 of an impact shutter is positioned behind the lens 11 and is pivotably mounted on a front interior plate 16 of the camera by a screw 17. A spring 18 urges the shutter blade to the normally closed position shown in FIG. 1. An arm 19 extends from the shutter blade 15, and when the arm 19 is struck (by a striker plate 58, as will be more fully explained) the shutter temporarily opens.

As shown in FIG. 2, the film 20 in the camera is partially wound in a supply roll 21 and positioned in a storage cylinder 22. The film 20 extends through a slot 23 in the storage cylinder, then between a rib 24 on the backwall of the camera and the back edge 25 of the exposure box 26, and then to a takeup spool 27 to which it is attached. The takeup spool 27 is mounted for rotation on a baseplate 32, and a tensioned spring (not shown) disposed inside the spool urges the spool in the direction of takeup rotation. The spool is held against rotation by the engagement of a stop (not shown) on the spool with an upstanding post (not shown) on a stop-release lever 29 (dotted lines in FIG. 2), which is pivotally mounted on the bottom of the baseplate 32; the post on the lever extends through an opening in the plate 32 into engagement with the stop on the spool. When the stop-release lever 29 is moved in the direction of the arrow 30 in FIG. 2, the post disengages the stop on the spool, and the spool is released for rotation under the urging of the tensioned spring inside the spool. The stop-release lever 29 is caused to quickly return to the position shown in FIG. 2 by a variety of means, such as a spring, or by travel of the post on the lever in a channel on the bottom of the takeup spool. When the stop-release lever 29 returns to the position shown in FIG. 2, the post on the lever reengages a stop on the takeup spool 27 and stops the spool from further rotation. The timing of the movement of the lever 29 is such that the spool 27 rotates only through an angle sufficient to advance the film one frame-length.

The shutter-actuating and film-advance-actuating mechanism of this invention is also mounted on the baseplate 32, which is located horizontally in the camera (in FIG. 1) and rests on four short cylindrical supports 33 that are located at the corners of the bottom wall of the camera. A shutter-actuating slide 34 is attached to the top of the baseplate 32 by retaining studs 35a, 35b, and 35c located in elongated slots 36 in the slide; washers 31 space the slide 34 from the baseplate 32. A spring 37 extends from a post 38 on the baseplate to a post 39 on the shutter-actuating slide, and the spring tension normally holds the shutter-actuating slide in its rest position shown in FIGS. 1 and 2.

A film-advance-actuating slide 41 is attached to the bottom of the baseplate 32 by the two retaining studs 35a and 35b, which extend through elongated slots 42 in the slide 41; washers 40 space the slide 41 from the baseplate 32. A spring 43 extends from a post 44 on the bottom wall of the camera to a post 45 on the film-advance-actuating slide 41, and the spring tension normally holds the slide 41 in its rest position shown in FIGS. 1 and 2.

The film-advance-actuating slide 41 is more fully illustrated in FIG. 3, and as will be seen in that figure and in FIGS. 1 and 2, includes a vertical flange 46 that extends upwardly from an extension 47 of the slide. A two-armed lever 48 is pivotably supported about a post 49 that extends from the backwall of the camera, with a cylindrical arm 50 on the lower end of the lever bearing against the vertical flange 46, and a cylindrical arm 51 on the upper end of the lever bearing against the bottom of the camera-actuating button 13. When the button 13 is depressed by a camera user, the lever 48 pivots, driving the film-advance-actuating slide 41 forward (to the right in FIG. 1).

Connection means link the shutter-actuating and film-advance-actuating slides during forward movement of the latter slide. More specifically, a lug 53 extends upwardly in FIG. 1 from the film-advance-actuating slide, through an opening 54 in the baseplate and through an opening 55 in the shutter-actuating slide 34, into abutment with an edge 56 of the shutter-actuating slide 34 that partially defines the opening 55. Thus, as the film-advance-actuating slide 41 is moved to its energized position, the engagement of the lug 53 with the edge 56 of the slide 34 causes the slide 34 to also be moved to its energized position.

A flexible and resilient striker plate 58, normally a thin metal plate, is attached to the shutter-actuating slide by a rivet 59 (see FIG. 2) that extends through a right-angle flange 60 of the striker plate. As seen in FIG. 1, the striker plate 58 also includes a depending arm 61 that abuts a configured edge 62 of the film-advance-actuating slide 41. The configured edge 62 and the depending arm 61 provide a cam surface-cam follower arrangement. More specifically, when when shutter-actuating and the shutter-actuating slides are in the relative positions they assume either when at rest or after they have been moved together to the right; the arm 61 engages a portion 62a of edge 62 that causes the striker plate 58 to be flexed out of its natural position. The striker plate 58 includes a short right-angle flange 63 that, except for the flexing of the plate 58, would be in position to strike the arm 19 on the shutter blade. In the position of the slide 34 shown in FIG. 5, the flange 63 has moved past the arm 19, so that upon release of the slide 34 from that position and release of the striker plate from its flexed, or withdrawn position, the flange 63 on the striker plate would strike the arm 19.

The film-advance-actuating slide 41 is designed for one end to be flexed downwardly as it nears the end of travel to its energized position so that engaging means—in this case, a finger 65—on that end of the slide can engage the end of the lever 29. Then, upon return movement of the slide 41 to the left in FIG. 1, the finger 65 would pivot the lever 29 in the direction of the arrow 30. Flexing of the slide 41 is caused as the slide 41 travels to the right by engagement of a ramp 66 on the slide 41 with an edge 67 of the baseplate 32 that defines one side of the opening 54 in the baseplate. The ramp 66 and the edge 67 are positioned so as to flex the slide 41 after the finger 65 has moved far enough to the right to pass the lever 29, as shown in FIG. 6.

When the slides 34 and 41 are in the position shown in FIGS. 4 and 5, the camera user is still free to release the camera-actuating button 13, and no exposure or film-advancement will occur. That is, upon release of the button 13, the slides would simply return together to their rest positions under the force of the springs 37 and 43, and the striker plate 58 and the finger 65, which are at this time positioned in their withdrawn positions, would not strike the shutter arm 19 or engage the stop-release lever 29.

But the flexing of the film-advance-actuating slide 41 by engagement of the ramp 66 with the edge 67 of the baseplate triggers the mechanism and causes actuating of the camera shutter and advancement of one frame of film to both occur in sequence. Flexing of the slide causes the lug 53 to disengage the edge 56 of the shutter-actuating slide 34, whereupon spring 37 causes the slide 34 to return rapidly (to the left in the drawings) to its rest position. The return of the slide 34 occurs much sooner that the camera user, whose pressure on the camera-actuating button 13 has been advancing the two slides, could release the button 13. Therefore, the film-advance-actuating slide 41 remains in the position shown in FIG. 6, and as the shutter-actuating slide 34 moves to the left in the drawings, the arm 61 of the striker plate 58 moves along the configured edge 62 of the slide 41 and travels over a recessed portion 62b. The resilience of the striker plate 58 causes the plate to straighten, whereupon the flange 63 is moved into an actuating position in which it will strike the arm 19 of the camera shutter and open the shutter; in FIG. 6, the slide 34 is shown during return travel and the flange 63 has just struck the arm 19 to open the shutter. The shutter remains open for only a short interval until the spring 18 returns the shutter to the position shown in FIG. 7.

Figure 7:
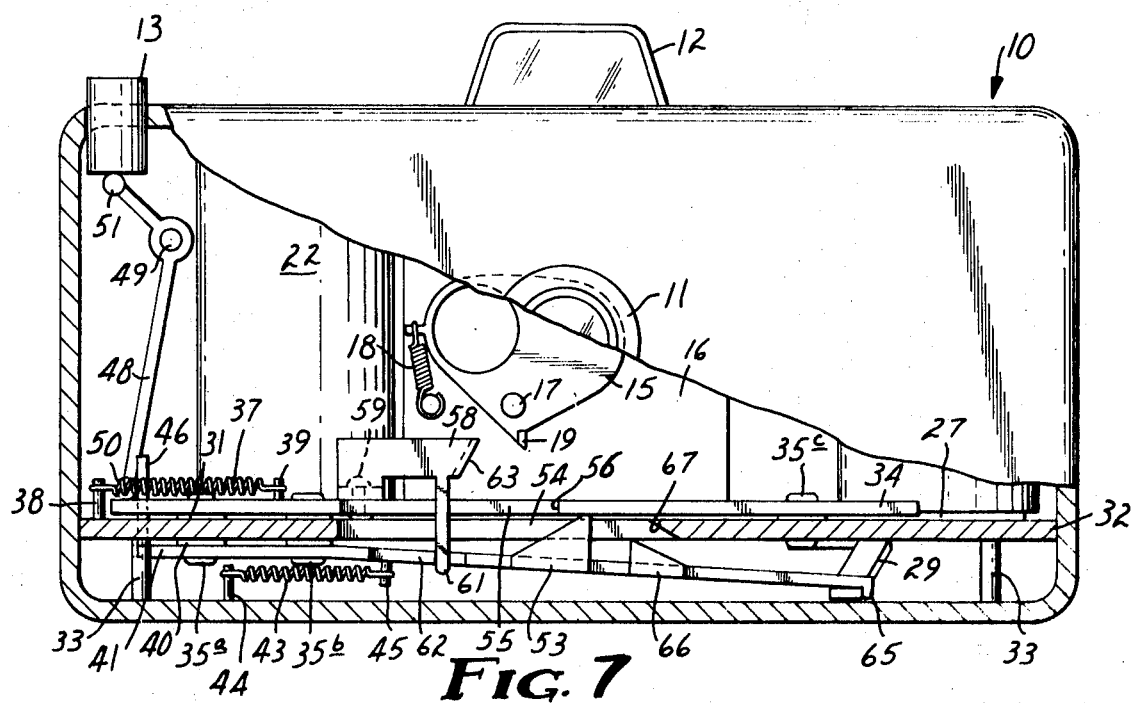

Meanwhile, the camera user releases the button 13, having pressed it as far as he can and having felt the release associated with disengagement of slide 34 from slide 41, and the spring 43 returns the film-advance-actuating slide 41 to its rest position. Since the shutter-actuating slide 34 has previously returned to its rest position, the lug 53 engages the bottom surface of the shutter-actuating slide 34, which serves to block return of the film-advance-actuating slide 41 to its unflexed position. As a result, as the slide 41 returns to its rest position (to the left in the drawings), the finger 65 remains in its actuating position in which it engages the lever 29 and moves the lever in the direction of the arrow 30 as shown in FIG. 7. Thereupon, the takeup spool 27 is released for rotation. The slide 41 is quickly returned to its rest position, and the finger 65 moves past the lever 29. The lever 29 then quickly returns to the position shown in FIG. 2, where, as previously noted, a stop on the spool and the post on the lever become engaged to stop the spool after one increment of rotation. In the rest position of the slide 41, the lug 53 registers with the opening 55 in the slide 34, thus permitting the slide 41 to return to its unflexed condition.

In a less desirable alternative to the shutter-actuating and film-advance-actuating mechanism described and illustrated in FIGS. 1–7, the striker plate 58 is formed without the arm 61 and the film-advance-actuating slide 41 is formed without the configured edge surface 62. In such a mechanism, the flange 63 on the striker plate 58 cams by the arm 19 of the shutter during forward movement of the shutter-actuating and film-advance-actuating slides (to the right in FIG. 1; the shutter 15 being held by stop means not shown from counterclockwise movement in FIG. 1). Such a mechanism requires a more careful control of tolerances than is required by the embodiment illustrated in FIGS. 1–7, since the positioning of the flange 63 beyond (that is on the right side in FIG. 1) of the arm 19 must occur simultaneously with disengagement of the lug 53 from the edge 56 of the shutter-actuating slide.

Though an impact shutter is best adapted to the invention, and best adapted to inexpensive preloaded cameras, other shutters are used in cameras of the invention. For example, some cameras of the invention incorporate iris-type shutters that are are opened when the shutter-actuating member engages and pivots a control lever which in turn rotates an annular ring that is disposed around the exposure aperture and opens a set of five blades that normally converge to cover the aperture. Also, though the invention is especially adapted to cause the short quick movement of a stop-release lever to release a spring-biased takeup spool, film-advance is accomplished in cameras of the invention in other ways. For example, in some cameras of the invention, the film-advance-actuating member moves a lever that, through a ratchet and pawl connection to the takeup spool, directly rotates the takeup spool in increments of rotation sufficient to advance film one frame-length.

I claim:
1. In a camera having,
  1. a shutter that is opened for a short picture-taking interval when a part of the shutter is moved, and

2. a lever that is movable to cause rotation of a takeup spool in an increment of rotation sufficient to advance film in the camera one frame-length, shutter-actuating and film-advance-actuating mechanism comprising
1. a shutter-actuating member mounted in the camera for movement against spring tension from a rest position to an energized position;
2. a film-advance-actuating member mounted in the camera for movement against spring tension from a rest position to an energized position;
3. a striker attached to the shutter-actuating member and adapted to move said part of the shutter during the return movement of the shutter-actuating member from its energized position to its rest position;
4. engaging means on the film-advance-actuating member adapted to engage the lever during return movement of the film-advance-actuating member adapted to engage the lever during return movement of the film-advance-actuating member from its energized position to its rest position;
5. drive means operable by the camera user to forward the film-advance-actuating member to its energized position and releasable to permit the member to return under the force of the spring tension from its energized position to its rest position;
6. connection means connecting the shutter-actuating member to the film-advance-actuating member so that forward movement of the film-advance-actuating member causes the shutter-actuating member to move forward; and
7. trigger means operable when the shutter-actuating and film-advance-actuating members are in their energized position for disconnecting the shutter-actuating member from the film-advance-actuating member, whereupon the shutter-actuating member returns under the force of the spring tension from its energized position to its rest position.

2. In a camera having,
1. an impact shutter that is opened for a short picture-taking interval when a part of the shutter is struck, and
2. a stop-release lever that is movable to release a spring-biased takeup spool for an increment of rotation sufficient to advance film in the camera one frame-length, shutter-actuating and film-advance-actuating mechanism comprising
1. a shutter-actuating member mounted in the camera for movement against spring tension from a rest position to an energized position;
2. a film-advance-actuating member mounted in the camera for movement against spring tension from a rest position to an energized position;
3. a striker attached to the shutter-actuating member and having actuating and withdrawn positions in which the striker is, respectively, in, and not in, position to strike said part of the shutter during return movement of the shutter-actuating member from its energized position to its rest position;
4. engaging means on the film-advance-actuating member having actuating and withdrawn positions in which the engaging means is, respectively, in, and not in, position to engage the stop-release lever during return movement of the film-advance-actuating member from its energized position to its rest position;
5. drive means operable by the camera user to forward the film-advance-actuating member to its energized position and releasable to permit the member to return under the force of the spring tension from its energized position to its rest position;
6. connection means connecting the shutter-actuating member to the film-advance-actuating member so that forward movement of the film-advance-actuating member causes the shutter-actuating member to move forward;
7. positioning means for maintaining the striker and engaging means in their withdrawn positions during movement of the shutter-actuating and film-advance-actuating members into their energized positions; and
8. trigger means operable when the shutter-actuating and film-advance-actuating members are in their energized position for simultaneously causing
   a. disconnection of the shutter-actuating member from the film-advance-actuating member, whereupon the shutter-actuating member returns under the force of the spring tension from its energized position to its rest position, and
   b. movement of the striker and engaging means into their actuating positions.

3. The shutter-actuating and film-advance-actuating mechanism of claim 2 in which
1. the shutter-actuating member and film-advance-actuating member are slides that travel closely adjacent parallel paths from their rest positions to their energized positions;
2. the connection means includes a lug that extends from the film-advance-actuating slide into abutment with an edge of the shutter-actuating slide, whereby movement of the film-advance-actuating slide from its rest position causes movement of the shutter-actuating slide from its rest position; and
3. The trigger means includes separator means for moving the shutter-actuating and film-advance-actuating slides apart when they reach their energized positions, whereby the lug is moved out of abutment with the edge of the shutter-actuating slide and the shutter-actuating slide is released for return movement under the influence of the spring tension.

4. The shutter-actuating and film-advance-actuating mechanism of claim 3 in which the striker is a flexible plate having a cam follower attached to it, the cam follower being in contact with an edge of the film-advance-actuating slide configured (a) to hold the striker in a flexed position when the shutter-actuating and film-advance-actuating slides are moved in forward direction and (b) to permit the striker to spring back to its unflexed condition when the shutter-actuating slide moves with respect to the film-advance-actuating slide.

5. The shutter-actuating and film-advance-actuating mechanism of claim 3 in which (a) the shutter-actuating slide remains in its original plane of travel and the film-advance-actuating slide flexes away from the shutter-actuating slide to accomplish the movement apart of the two slides, (b) the engaging means is moved to actuating position by flexing of the film-advance-actuating slide away from the shutter-actuating slide, and (c) the lug engages the shutter-actuating slide after the latter's return movement to rest position to hold the film-advance-actuating slide in its separated position during its return movement to rest position.

UNITED STATES PATENT OFFICE
CERTIFICATE OF CORRECTION

Patent No. 3,603,235          Dated    September 7, 1971

Inventor(s)   Norman E. Nelson

It is certified that error appears in the above-identified patent and that said Letters Patent are hereby corrected as shown below:

Column 3, lines 32 and 33 the sentence should read -- More specifically, when the shutter-actuating and film-advance-actuating slides are in the relative positions they assume either when at rest or after they have been moved together to the right, the arm 61 engages a portion 62a of edge 62 that causes the striker plate 58 to be flexed out of its natural position. --. Column 4, line 59, cancel "are", second occurrence. Column 5, lines 18-20, cancel "adapted to engage the lever during return movement of the film-advance-actuating member".

Signed and sealed this 6th day of June 1972.

(SEAL)
Attest:

EDWARD M. FLETCHER, JR.          ROBERT GOTTSCHALK
Attesting Officer                  Commissioner of Patents